(12) United States Patent
Overdevest et al.

(10) Patent No.: US 12,019,141 B2
(45) Date of Patent: Jun. 25, 2024

(54) RADAR PROCESSOR

(71) Applicant: NXP B.V., Eindhoven (NL)

(72) Inventors: Jeroen Overdevest, Eindhoven (NL);
Feike Guus Jansen, Eindhoven (NL);
Arie Geert Cornelis Koppelaar,
Giessen (NL); Alessio Filippi,
Eindhoven (NL)

(73) Assignee: NXP B.V., Eindhoven (NL)

( * ) Notice: Subject to any disclaimer, the term of this patent is extended or adjusted under 35 U.S.C. 154(b) by 223 days.

(21) Appl. No.: 17/451,515

(22) Filed: Oct. 20, 2021

(65) Prior Publication Data
US 2022/0187438 A1   Jun. 16, 2022

(30) Foreign Application Priority Data
Dec. 11, 2020   (EP) .................................... 20213499

(51) Int. Cl.
*G01S 13/532*   (2006.01)
*G01S 7/288*   (2006.01)
(Continued)

(52) U.S. Cl.
CPC .......... *G01S 13/532* (2013.01); *G01S 7/2883* (2021.05); *G01S 7/40* (2013.01); *G01S 13/584* (2013.01);
(Continued)

(58) Field of Classification Search
CPC .......... G01S 7/41; G01S 7/356; G01S 7/2883; G01S 13/532; G01S 13/584; G01S 13/931
See application file for complete search history.

(56) References Cited

U.S. PATENT DOCUMENTS 9,689,967 B1 *   6/2017   Stark .................... G01S 7/0233
2018/0231652 A1   8/2018   Rao et al.
(Continued)

FOREIGN PATENT DOCUMENTS

CN       104849711 A    8/2015
DE    102015222043 A1    5/2017
(Continued)

OTHER PUBLICATIONS

Bourdoux, A., "PMCW Waveform and MIMO Technique for a 79 GHz CMOS Automotive Radar", 2016 IEEE Radar Conference (RadarConf), May 2-6, 2016.
(Continued)

*Primary Examiner* — Vladimir Magloire
*Assistant Examiner* — Maxine Mckenzie Phillips

(57) ABSTRACT

A radar processor for processing a frame of radar data received from one or more targets, the frame of radar data having a carrier frequency and comprising a sequence of codewords with a codeword repetition interval, wherein the carrier frequency and the codeword repetition interval define an unambiguous velocity range, the radar processor configured to: receive the frame of radar data; transform the frame to obtain a velocity data array; apply a correction algorithm to the velocity data array to correct a Doppler shift of the frame to obtain a corrected array, wherein the correction algorithm comprises a set of Doppler correction frequencies corresponding to a set of velocity gates and at least one of the set of Doppler correction frequencies corresponds to a velocity gate outside the unambiguous velocity range; and perform range processing on the corrected array to obtain a range-Doppler map.

20 Claims, 11 Drawing Sheets

(51) Int. Cl.
*G01S 7/40* (2006.01)
*G01S 13/58* (2006.01)
*G01S 13/87* (2006.01)
*G01S 13/931* (2020.01)

(52) U.S. Cl.
CPC .......... *G01S 7/4004* (2013.01); *G01S 13/878* (2013.01); *G01S 2013/93271* (2020.01)

(56) References Cited

U.S. PATENT DOCUMENTS

2019/0317207 A1   10/2019  Schroder et al.
2023/0126991 A1*  4/2023  Maor ........................ G01S 7/40
                                                                       342/174

FOREIGN PATENT DOCUMENTS

DE       102019103684 A1 *  8/2019  ........... G01S 13/284
WO   WO-2018115370 A1 *  6/2018  ........... G01S 13/003

OTHER PUBLICATIONS

Hakobyan, G., "High-Performance Automotive Radar", Advances in Radar Systems for Modern Civilian and Commercial Applications: Part 2, IEEE Signal Processing Magazine, Sep. 2019.

Overdevest, J., "Doppler Influence on Waveform Orthogonality in 79 GHz MIMO Phase-Coded Automotive Radar", IEEE Transactions on Vehicular Technology, vol. 69, No. 1, Jan. 2020.

Schweizer, B., "A Doppler-Tolerant Stepped-Carrier OFDM-Radar Scheme Based on All-Cell-Doppler-Correction", 2019 20th International Radar Symposium, Jun. 26-28, 2019.

* cited by examiner

RADAR PROCESSOR

CROSS-REFERENCE TO RELATED APPLICATIONS

This application claims the priority under 35 U.S.C. § 119 of European Patent application no. 20213499.5, filed on 11 Dec. 2020, the contents of which are incorporated by reference herein.

FIELD

The present disclosure relates to a radar processor for processing radar data.

SUMMARY

According to a first aspect of the present disclosure there is provided a radar processor for processing a frame of radar data received from one or more targets, the frame of radar data having a carrier frequency and comprising a sequence of codewords with a codeword repetition interval, wherein the carrier frequency and the codeword repetition interval define an unambiguous velocity range, the radar processor configured to:
  receive the frame of radar data;
  transform the frame to obtain a velocity data array;
  apply a correction algorithm to the velocity data array to correct a Doppler shift of the frame to obtain a corrected array, wherein the correction algorithm comprises a set of Doppler correction frequencies corresponding to a set of velocity gates and at least one of the set of Doppler correction frequencies corresponds to a velocity gate outside the unambiguous velocity range; and
  perform range processing on the corrected array to obtain a range-Doppler map.

The radar processor can advantageously correct for Doppler shifts corresponding to velocities that fall both inside and outside the unambiguous velocity range.

In one or more embodiments, the radar processor may be further configured to determine a velocity of each of the one or more targets based on the range-Doppler map.

In one or more embodiments, the correction algorithm may comprise a plurality of correction matrices, each correction matrix corresponding to a different set of Doppler correction frequencies each with an associated velocity range. The radar processor may be configured to:
  apply the correction algorithm by multiplying the velocity data array with each one of the plurality of correction matrices to obtain a plurality of respective corrected arrays; and
  perform range processing on the plurality of corrected arrays to obtain the range-Doppler map.

In one or more embodiments, a first correction matrix may correspond to a first set of Doppler correction frequencies associated with the unambiguous velocity range and a second correction matrix may correspond to a second set of Doppler correction frequencies associated with a second velocity range outside the unambiguous velocity range.

In one or more embodiments, the radar processor may be further configured to:
  receive a-priori data providing information on the target velocities of the one or more targets at an earlier time; and
  determine the set of Doppler frequencies based on the a-priori data.

In one or more embodiments, the radar processor may be configured to:
  determine a velocity of each of the one or more targets based on the range-Doppler map for the frame of data;
  store the velocity of each of the one or more targets as the a-priori data; and
  receive the a-priori data for use with a subsequent frame of radar data.

In one or more embodiments, the radar processor may be configured to receive the a-priori data from a second radar processor.

In one or more embodiments, the radar processor may be further configured to:
  determine a velocity of each of the one or more targets based on the range-Doppler map for the frame of data;
  determine a subset of correction matrices comprising correction matrices with a velocity range encompassing one or more of the velocities of each of the one or more targets;
  receive a second frame of time-domain radar data;
  transform the second frame to obtain a second velocity data array;
  correct the second velocity data array based on the subset of correction matrices to obtain one or more second corrected arrays;
  perform range processing on the one or more second corrected arrays to obtain a second range-Doppler map.

In one or more embodiments, the radar processor may be configured to not correct the second velocity data array based on correction matrices not in the subset of correction matrices.

In one or more embodiments, the radar processor may be configured to correct the second velocity data array based on only the subset of correction matrices to obtain one or more second corrected arrays.

In one or more embodiments, the radar processor may be configured to multiply the second velocity data array with each one of the subset of correction matrices to obtain the one or more second corrected arrays.

In one or more embodiments, the radar processor may be configured to determine a consolidated correction matrix based on the subset of correction matrices;
  multiply the second velocity data array with the consolidated correction matrix to obtain a consolidated second corrected array; and
  perform range processing on the consolidated second corrected array to obtain the second range-Doppler map.

In one or more embodiments, the radar processor may be configured to:
  receive a third frame of time-domain radar data;
  transform the third frame to obtain a third velocity data array;
  multiply the velocity data array with each one of the plurality of correction matrices, to obtain a plurality of respective third corrected arrays;
  perform range processing on the plurality of third corrected arrays to obtain a third range-Doppler map;
  determine a velocity of each of the one or more targets based on the third range-Doppler map for the third frame of data; and
  update the subset of correction matrices comprising correction matrices with a velocity range encompassing one or more of the velocities of each of the one or more targets.

In one or more embodiments, the radar processor may be configured to preform range processing in the frequency domain.

In one or more embodiments, the radar processor may be configured to preform range processing in the time domain.

In one or more embodiments, the radar processor may be configured to perform range processing using a matched filter.

In one or more embodiments, the frame of radar data may be a phase modulated continuous wave, PMCW, frame of radar data and the radar processor is suitable for use in a PMCW radar system.

In one or more embodiments, the frame of radar data may be a frame of time-domain radar data.

In one or more embodiments, the set of Doppler correction frequencies may comprise a set of normalised Doppler correction frequencies.

In one or more embodiments, the radar processor may be configured to receive the frame of radar data from a plurality of receivers in a multiple input multiple output, MIMO, radar system arrangement.

According to a second aspect of the present disclosure, there is provided a radar system comprising any radar processor disclosed herein.

In one or more embodiments, the radar system may be configured to transmit frames of radar data comprising a sequence of identical codewords.

In one or more embodiments, the radar system may be an automotive radar system.

In one or more embodiments, the radar system may comprise a MIMO radar system.

According to a further aspect of the present disclosure, there is provided a method for processing a frame of radar data received from one or more targets, the frame of radar data having a carrier frequency and comprising a sequence of codewords with a codeword repetition interval, wherein the carrier frequency and the codeword repetition interval define an unambiguous velocity range, the method comprising:
  receiving the frame of radar data;
  transforming the frame to obtain a velocity data array;
  applying a correction algorithm to the velocity data array to correct a Doppler shift of the frame to obtain a corrected array, wherein applying the correction algorithm comprises applying a set of Doppler correction frequencies corresponding to a set of velocity gates, wherein at least one of the set of Doppler correction frequencies corresponds to a velocity gate outside the unambiguous velocity range; and
  performing range processing on the corrected array to obtain a range-Doppler map.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Automotive radars are sensors that are able to extract range, velocity and azimuthal/elevational angle information of multiple objects (or targets) by transmitting and receiving radio-frequency (RF) electromagnetic waves. Although the measurement frames of the sensors are of short time duration, rapidly changing scenarios can highly affect the radar's performance. Doppler frequency shifts are known to distort radar waveforms, while each waveform shows different tolerance to the Doppler frequency shifts. Frequency-Modulated Continuous Wave (FMCW) radars are known for their robustness against Doppler. On the other hand, Phase-Modulated Continuous Wave (PMCW) radars may be less tolerant to artefacts arising from Doppler shifts. In radar, correction for the individual Doppler-shifted waveforms can be complex because reflections may be received from all target objects simultaneously. The present disclosure provides a radar processor and method for processing radar data to correct for Doppler shifts in a way that is more tolerant to Doppler shifts including for PMCW radars. The disclosed radar processor can advantageously correct for Doppler shifts corresponding to velocities that fall both inside and outside an unambiguous velocity range.

A PMCW radar can transmit codeword(s) that feature (nearly-)perfect auto- and cross-correlation sidelobes in order to achieve sufficient dynamic range. Examples of code families that exhibit these exceptional properties are the Almost Perfect Autocorrelation Sequences (APAS) or Zero-Correlation Zone (ZCZ) sequences. In radar, dynamic range is a crucial aspect that should be in the range of 80-90 dB to avoid target masking (similar to near-far problem in communication, but more extreme).

The nearly-perfect correlation properties of the above-mentioned sequences can deteriorate the radar performance significantly when they are exposed to a moving target. The Doppler frequency shift resulting from the moving target can impact the sequences within a single code and destroy the zero-sidelobe behaviour.

A received radar signal may be considered as a transmitted waveform x(t) that is reflected from K targets, where each target at distance $R_k$ is moving at constant velocity $v_k$, which respectively induces a round-trip delay $T_k$ which is assumed to be constant for the duration of the waveform and Doppler frequency shift $f_{D,k}$ (narrowband assumption). Then, the received signal, y(t), can be denoted as:

$$y(t) = \sum_{k=0}^{K-1} x(t - \tau_k) \cdot e^{j2\pi f_{D,k} t} \cdot e^{j4\pi f_c \frac{R_k}{c_0}} \quad (1)$$

Here, the Doppler shift equals $f_{D,k}=2v_k/\lambda$, where $\lambda$ is the wavelength of the carrier.

Figure 1:
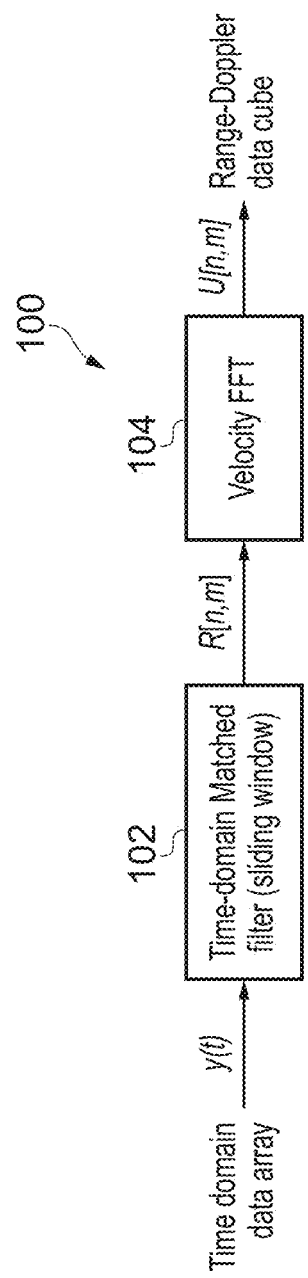
FIG. 1 illustrates a method for processing received radar data by a radar processor of a PMCW radar system.

FIG. 1 illustrates a method 100 for processing received radar data by a radar processor of a PMCW radar system.

The radar processor may receive a time domain data array. The time domain data array may comprise the received signal, y, arranged in a 2-dimensional array with a first (fast) axis corresponding to a symbol or sample of a transmitted codeword, c, and a second (slow) axis corresponding to a number, N, of transmitted codewords (or consecutively transmitted codewords). The radar processor may receive the received signal y from an output of an analog-to-digital converter (ADC).

At step 102, the radar processor can first apply a time-domain matched filter (sliding window) to get the distance to the targets:

$$R[n, m] = \sum_{l=0}^{L_c-1} c[l] y^*[l - m + nL_c] \quad (2)$$

where n is a slow axis index, l is a fast axis index, m is a delay index related to the distance, c is the codeword of length $L_c$ that is transmitted N times and y is the received signal of length $NL_c$ samples.

At step 104, the radar processor can estimate the Doppler frequencies using a Fast Fourier Transform (FFT), since the phase shift between the consecutively transmitted codewords (referred to as slow-time samples) of the $k^{th}$ target reflection can be denoted as:

$$\phi_k[n] = 4\pi \frac{R_k + v_k \cdot n \cdot T_{CRI}}{\lambda} = \phi_0 + \Delta \phi_k[n] \quad (3)$$

where $T_{CRI}$ indicates a code repetition interval. In examples where the codewords are transmitted back-to-back with no intervening gaps, the codeword repetition interval is equal to $L_c \times T_c$, where $T_c$ is a duration of a codeword bit, equal to the inverse of the bit rate of the transmitted code bits.

The $k^{th}$ target reflection experiences a phase behaviour that is linear with its velocity. A linear phase increase or decrease manifests itself as a frequency, which can be efficiently calculated by a Fast Fourier transform over the slow-time period to provide a range-Doppler map, U[n,m]:

$$U[n, m] = \frac{1}{N} \sum_{p=0}^{N-1} R[p, m] e^{-j2\pi n \frac{p}{N}} \quad (4)$$

The method 100 of FIG. 1 can result in unsatisfactory sidelobe level appearance or amplification. As discussed further below, the method 100 may also identify targets with a velocity falling outside an unambiguous velocity range (defined by the radar system) as having a velocity within the unambiguous velocity range due to velocity aliasing or velocity folding. For a particular frame of radar data, the unambiguous velocity range is defined by a carrier frequency of the frame and the codeword repetition interval, $T_{CRI}$, of a sequence of codewords within the frame. The unambiguous velocity range is a term well known in the art and corresponds to $\pm v_{ua}$, a maximum unambiguous radial velocity of a target relative to the radar processor or radar system. The maximum unambiguous radial velocity, $v_{ua}$, is defined by the codeword repetition time $T_{CRI}$ of the PMCW radar:

$$v_{ua} \leq \left| \frac{\lambda}{4 T_{CRI}} \right| \, [\text{ms}^{-1}] \quad (5)$$

The code repetition interval, $T_{CRI}$, may be considered as the sampling period of the linear phase in equation (3). If $T_{CRI}$ is too large, relative to a target velocity, the target is under sampled and phase changes larger than +/−π may be obtained. These phase changes cannot be distinguished from phase changes that are smaller than +/−π. The resulting ambiguity is referred to as velocity aliasing.

Selection of the codeword repetition interval typically comprises a trade-off between maximising the unambiguous velocity range by using short codeword repetition intervals and maximising the unambiguous distance or other code related properties, such as the code set size (relating to the number of simultaneous transmit antennas), the zero-correlation widths/sidelobe behaviour, by using long codeword repetition intervals. The unambiguous distance is defined by the following equation:

$$D_{ua} \leq \frac{c T_{CRI}}{2} \, [m] \quad (6)$$

One or more example radar processors and methods disclosed herein can overcome this trade-off by detecting targets with target velocities falling outside the unambiguous velocity range. Furthermore, examples of the present disclosure provide improved sidelobe suppression by performing Doppler shift correction prior to range processing.

Figure 2:
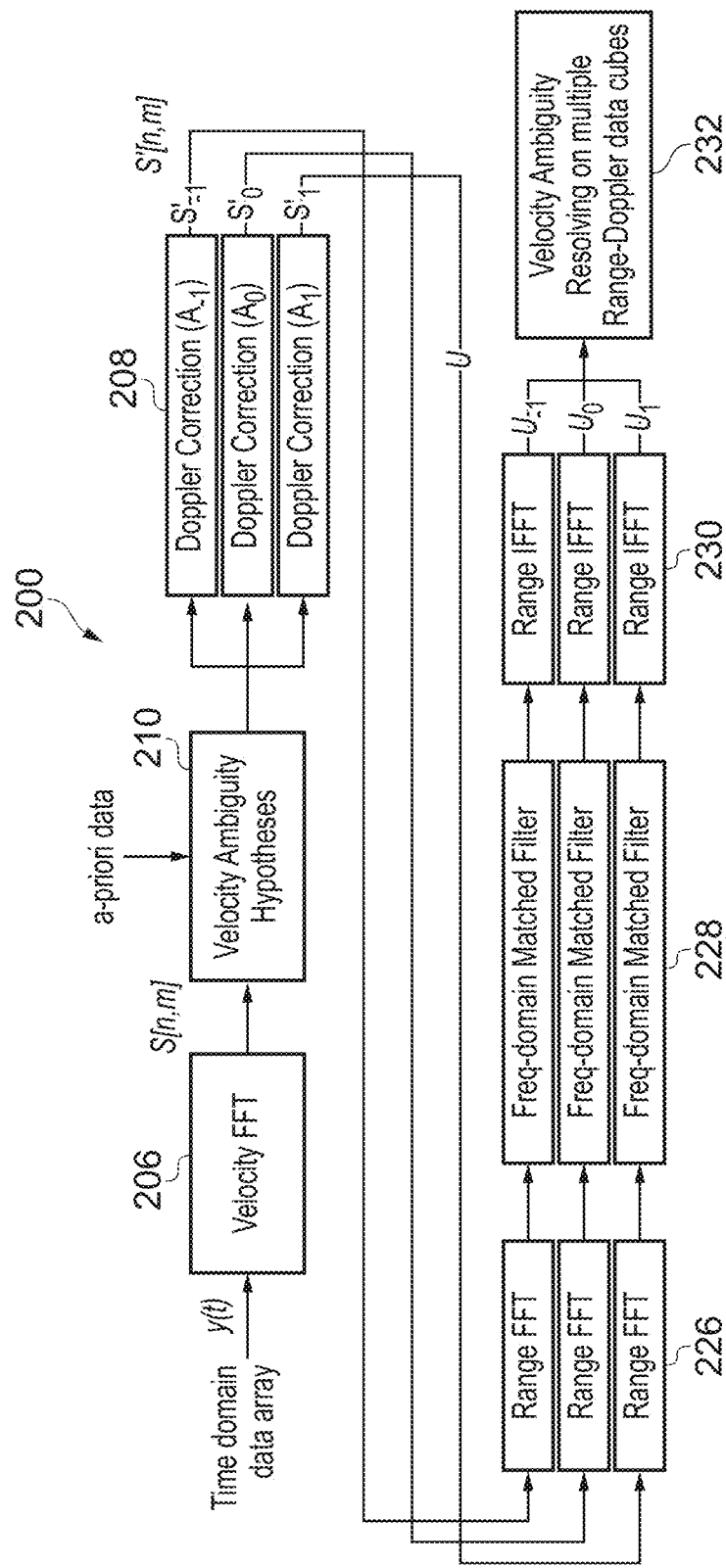
FIG. 2 illustrates a method for processing radar data received from one or more targets by a radar processor of a PMCW radar system according to an embodiment of the present disclosure.

FIG. 2 illustrates a method 200 for processing radar data received from one or more targets by a radar processor of a PMCW radar system according to an embodiment of the present disclosure.

The method comprises the radar processor: receiving a frame of radar data, y(t), the frame of radar data having a carrier frequency and comprising a sequence of codewords, wherein the carrier frequency and the codeword repetition interval define an unambiguous velocity range; transforming 206 the frame to obtain a velocity data array, S[n,m]; applying 208 a correction algorithm, A, to the velocity data array to correct a Doppler shift of the frame (resulting from target velocities of the one or more targets relative to the radar processor) to obtain a corrected array, S'[n,m], wherein applying the correction algorithm comprises correcting the velocity data array with a set of Doppler correction frequencies corresponding to a set of velocity gates, wherein at least one of the set of Doppler correction frequencies corresponds to a velocity gate outside the unambiguous velocity range; and performing 226, 228, 230 range processing on the corrected array, S'[n,m], to obtain a range-Doppler map, U.

By including at least one Doppler correction frequency corresponding to a velocity gate outside the unambiguous velocity range, the radar processor can detect target velocities with ambiguous velocities falling outside the unambiguous velocity range. In particular, the Doppler corrected range-Doppler map, U, is extended beyond the unambiguous velocity range where conventionally ambiguous targets can be identified.

In the illustrated example, the radar processor applies the correction algorithm by multiplying 208 the velocity data array, S[n,m], with each one of a plurality of correction matrices, $A_{-1}$, $A_0$, $A_1$, to obtain a respective plurality of corrected arrays, $S'_{-1}$, $S'_0$, $S'_1$. Each correction matrix, $A_{-1}$, $A_0$, $A_1$, may correspond to a different set of Doppler correction frequencies each with a corresponding velocity range. The set of Doppler correction frequencies for a first correction matrix, $A_0$, may correspond to the unambiguous velocity range and the set of Doppler correction frequencies for a second correction matrix, $A_{-1}$, $A_1$, may correspond to an ambiguous velocity range outside the unambiguous velocity range. The method may comprise performing 226, 228, 230 range processing on each of the plurality of corrected arrays, $S'_{-1}$, $S'_0$, $S'_1$, to obtain a respective plurality of range-Doppler maps, $U_{-1}$, $U_0$, $U_1$. The plurality of range-Doppler maps, $U_{-1}$, $U_0$, $U_1$, may form a single range-Doppler map, U.

The PMCW radar system may transmit and receive the frame of radar data. As discussed in relation to FIG. 1, the radar processor may receive a frame of time-domain radar data, y(t), as a data array, Y. The data array, Y, may comprise the received signal, y(t), arranged in a 2-dimensional array with a first (fast) axis corresponding to a symbol or sample of a transmitted codeword, c, and a second (slow) axis corresponding to a number, N, of transmitted codewords (or consecutively transmitted codewords) in the frame. In some examples, the method may comprise the radar processor arranging the received signal, y(t), as the data array, Y. In some examples, the radar processor may receive the radar data from multiple receivers and arrange the data array as a data cube. The radar processor may receive the received signal, y(t), from an output of an analog-to-digital converter (ADC).

In some examples, the transmitted codewords within the frame may be identical, to enable construction of the data array, Y. In some examples, the radar system may carry out low-rate communication by changing codewords (for multiple transmitters) on a frame-to-frame basis.

After the radar processor receives all time-domain ADC data for the frame, the radar processor transforms 206 the frame to obtain a velocity data array, S. In this way, the radar processor can extract the velocities of all targets in the received data. In this example, the radar processor obtains the velocity data array, S, by taking an FFT along the second (slow-time) axis of the data array (corresponding to consecutively transmitted codewords). The FFT process can be written mathematically as:

$$S[n, m] = \frac{1}{N}\sum_{p=0}^{N-1} Y[p, m]e^{-j2\pi n \frac{p}{N}} \quad (7)$$

where Y is the data array corresponding to an $N \times L_c$ matrix (where, as before, c is the codeword of length $L_c$ that is transmitted N times) which is constructed from the received signal, y. The resulting velocity data array, S, from equation (7) contains the one or more targets separated by velocity, whose energy can be concentrated in a specific velocity gate (or bin) across all fast-time samples.

Figure 3:
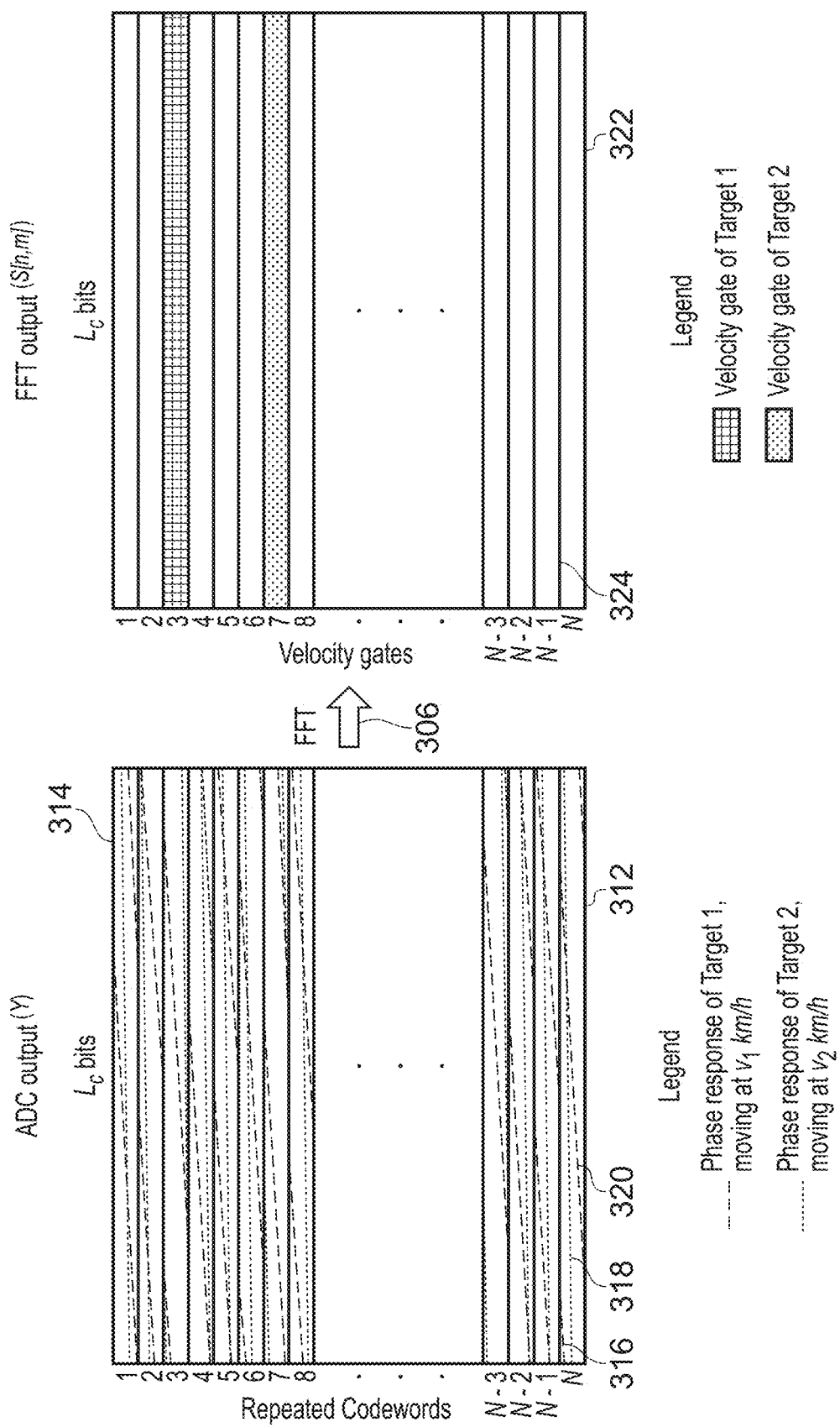
FIG. 3 provides a schematic illustration of the data transformation in an example FFT step.

FIG. 3 provides a schematic illustration of the data transformation in an example FFT step 306 such as the Fourier transform step of equation 7.

A data array 312 of a frame of data received from an ADC of the radar system is illustrated on the left-hand side of FIG. 3. The data array is arranged with a first, fast axis 314 corresponding to the number of bits, $L_c$, of each codeword and a second, slow axis 316 corresponding to the number of codewords, N, in the frame.

In this example there are two moving targets: a first moving target moving at a first velocity, $v_1$, and a second moving target moving at a second velocity, $v_2$. Each moving target imparts a corresponding Doppler frequency shift on the frame of radar data. The radar processor receives the frame of data 312 comprising the frequency shifts.

A first phase response 318 along the first axis 314 resulting from the Doppler shift from the first target can be seen for each of the N codewords as sloping dotted lines 318 having a first gradient. A second phase response 320 along the first axis 314 resulting from the Doppler shift from the second target can be seen for each of the N codewords as sloping dashed lines 320 having a second gradient.

The radar processor performs a FFT 306 along the second, slow axis 316 of the data array 312 to obtain the velocity data array 322, illustrated on the right hand side of the figure. The velocity data array 322 comprises a first fast axis corresponding to the first, fast axis 314 of the data array 312. A second axis 324 of the velocity data array 322 corresponds to a sequence of N velocity bins each corresponding to a range of target velocities. As illustrated by the figure, only the $3^{rd}$ and $7^{th}$ velocity bin of the velocity data array 322 comprise any data because these bins respectively encompass the first and second velocities of the first and second targets. In this way, by performing an FFT 306 on the data array 312 to obtain the velocity data array 322, the radar processor can separate received signals within the data frame based on their corresponding target velocity profile.

Returning to FIG. 2, following performance of the FFT 206, the radar processor corrects 208 Doppler shifts in the velocity data array. In this example, the radar processor applies a Doppler correction by multiplying the velocity data array, S, by each one of a plurality of correction matrices, $A_{-1}$, $A_0$, $A_1$, to obtain a respective plurality of corrected arrays, $S'_{-1}$, $S'_0$, $S'_1$. Each correction matrix, $A_{-1}$, $A_0$, $A_1$, corresponds to a different velocity range, as discussed further below. The correction (or compensation) matrices, $A_{-1}$, $A_0$, $A_1$, can correct for phase variation along the first, fast axis of the velocity data array, resulting from the Doppler frequency shift. In this way, the radar processor can correct for phase variation by de-rotating the Doppler distortions over the fast-time bits/samples. Correcting for phase variation before range processing can provide range-Doppler maps having target peaks with improved sidelobe suppression.

We first consider the correction of the velocity data array for unambiguous targets having velocities within the unambiguous velocity range to illustrate the improvement of sidelobe suppression of the Doppler compensated method of FIG. 2 relative to the uncompensated method of FIG. 1. Such unambiguous targets can be corrected by applying the first correction matrix, $A_0$. The correction of the velocity data array for targets having a velocity outside the unambiguous velocity range through application of Doppler frequencies corresponding to velocity gates outside the unambiguous velocity range, is discussed further below in relation to FIG. 9.

The first correction matrix, $A_0$, corresponds to a set of Doppler frequencies associated with the unambiguous velocity range. The radar processor can perform the Doppler compensation using predetermined knowledge of the velocity FFT output. In other words, the values of the first correction matrix, $A_0$, can be predetermined based on the unambiguous velocity range. By definition of the FFT ($-\pi \leq \omega < \pi$), the unambiguous set of Doppler frequencies (unambiguously normalized estimated frequency range) corresponding to each of the velocity gates in the unambiguous velocity range is:

$$f'_{D_0} = \left[-\frac{1}{2}, -\frac{1}{2}+\frac{1}{N}, \ldots, \frac{1}{2}-\frac{2}{N}, \frac{1}{2}-\frac{1}{N}\right]. \quad (8)$$

Every individual estimated Doppler frequency corresponds to an independent phase evolution over the fast-axis samples, which can be defined as:

$$\phi[m]=[\phi_0, \phi_0+2\pi f_D T_c, \phi_0+2\pi f_D 2T_c, \ldots, \phi_0+2\pi f_D(L_c-1)T_c]=\phi_0+2\pi f'_{D_0} mT_c \quad (9)$$

where Tc is a duration of each codeword bit (on the first fast axis), equal to the inverse of the bit rate of the transmitted code bits.

Combining Equations (8) and (9), can provide the Doppler-induced phase change on the slow-time and fast-time axes, respectively, to provide the first compensation matrix, $A_0$, as:

$$A_0[n,m] = e^{-j2\pi \cdot f'_{D_0}(n)\frac{m}{L_c}} \quad (10)$$

Equation (10) holds for non-ambiguous targets in the velocity domain (that is targets with a velocity within the unambiguous velocity range). The radar processor can correct the velocity data array, S, by applying an element-wise matrix multiplication with the compensation matrix, $A_0$, to obtain a respective corrected array, $S'_0$:

$$S'_0[n,m]=A_0[n,m] \cdot S[n,m] \quad (11)$$

Following determination 208 of the corrected array, $S'_0$, the radar processor can perform range processing to extract range information for the corrected array, $S'_0$.

In some examples, the radar processor may extract the range information using a matched filtering operation in the frequency domain. Therefore, the radar processor transforms the corrected array, $S_0'$, from time-domain to frequency domain along the first, fast axis (the codeword dimension) using an FFT operation. Similarly, the radar processor transforms the transmitted codeword, c, to the frequency domain.

In this way, the radar processor can perform range processing on the corrected array, S', to determine a Doppler compensated range-Doppler map, $U_0$. The radar processor may perform 226 a Range FFT to transform the corrected array, $S_0'$, and the codeword, c, into the frequency domain. The radar processor may apply 228 a frequency domain matched filter to the frequency domain corrected array and codeword followed by a range inverse FFT (IFFT) 230 to obtain the range-Doppler map, $U_0$. The steps of performing this cyclic correlation in the frequency domain can be written as:

$$U_0 = IFFT\{FFT\{S'_0\} * \text{conj}(FFT\{1c^T\})\} \quad (12)$$

with $U_0$ being the Doppler-compensated range-Doppler map and 1 being an all-one vector.

In other examples, the radar processor may extract the range information in the time-domain, instead of the frequency domain approach. In such examples, the radar processor can perform an IFFT step (instead of a FFT) on the corrected data array along the slow axis to return to the time domain. The radar processor may then perform a filter-convolution using a matched filter. The radar processor may perform the time domain matched filtering using a sliding correlator.

The radar processor may determine 232 a velocity of each of the one or more targets based on the Doppler compensated range-Doppler map, U.

Figure 5:
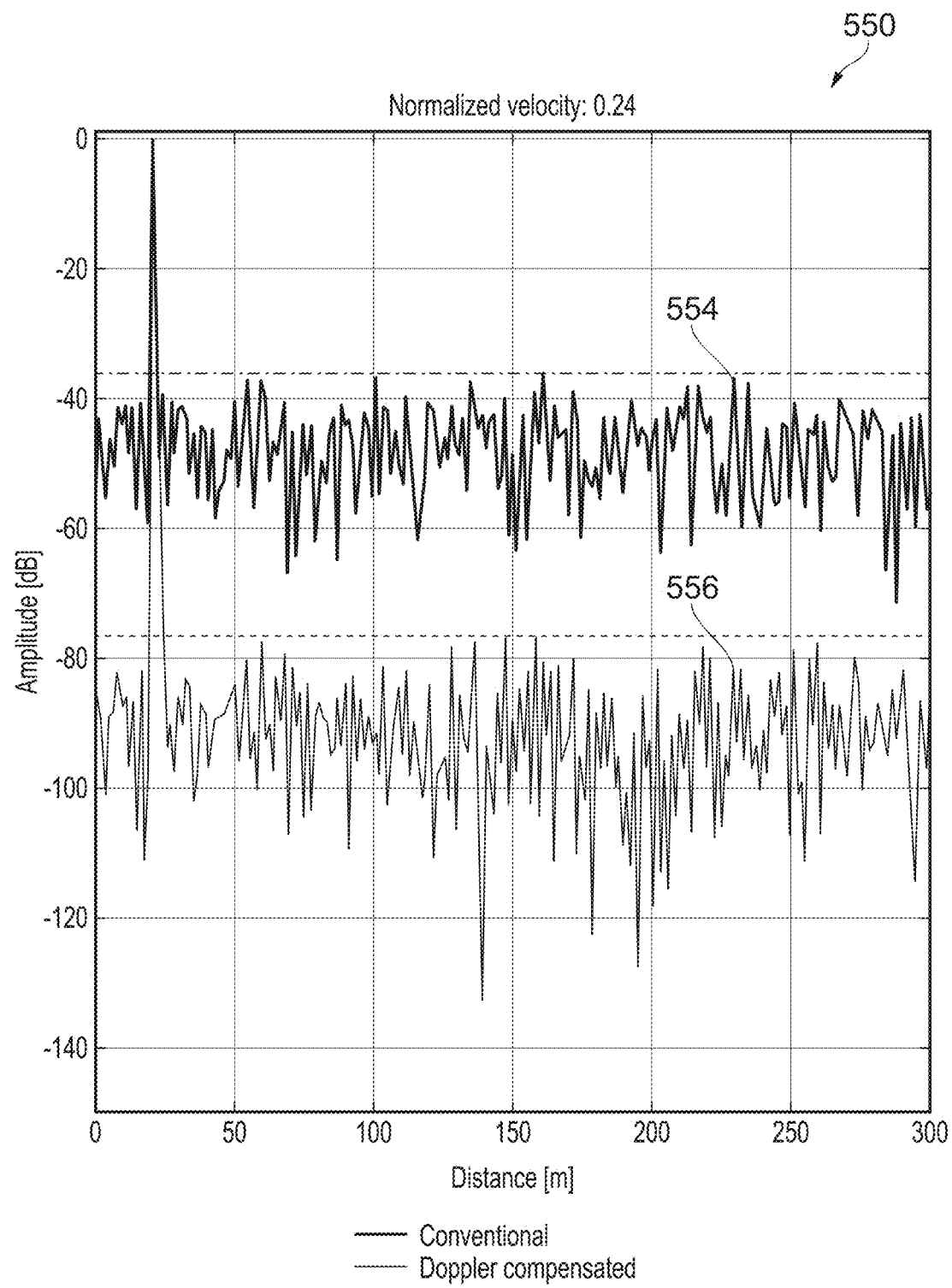
FIG. 5 illustrates a first example comparison of range-Doppler data produced by a radar processor using the uncompensated method of FIG. 1 and the Doppler-compensated method of FIG. 2.
Figure 5:
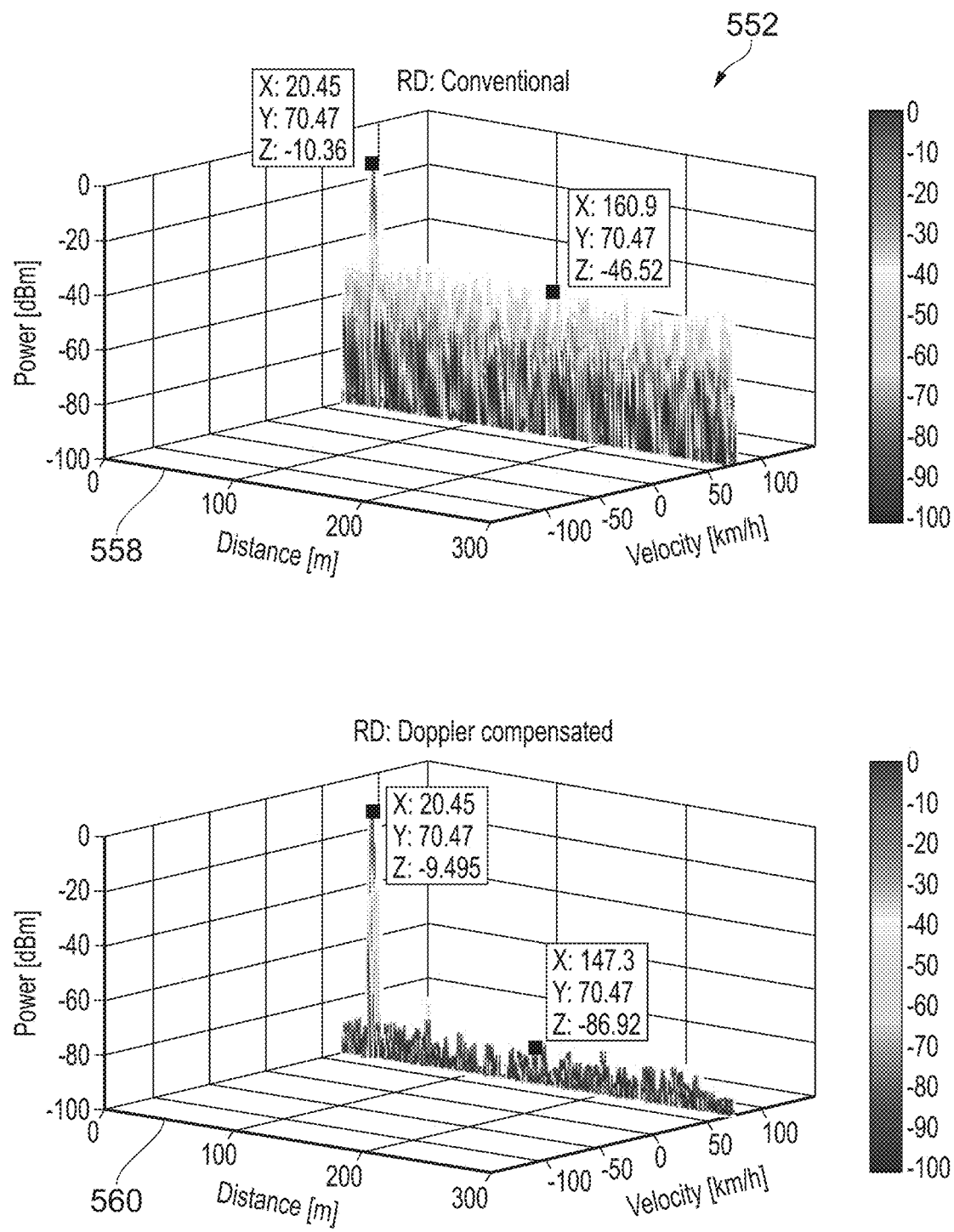
Figure 6:
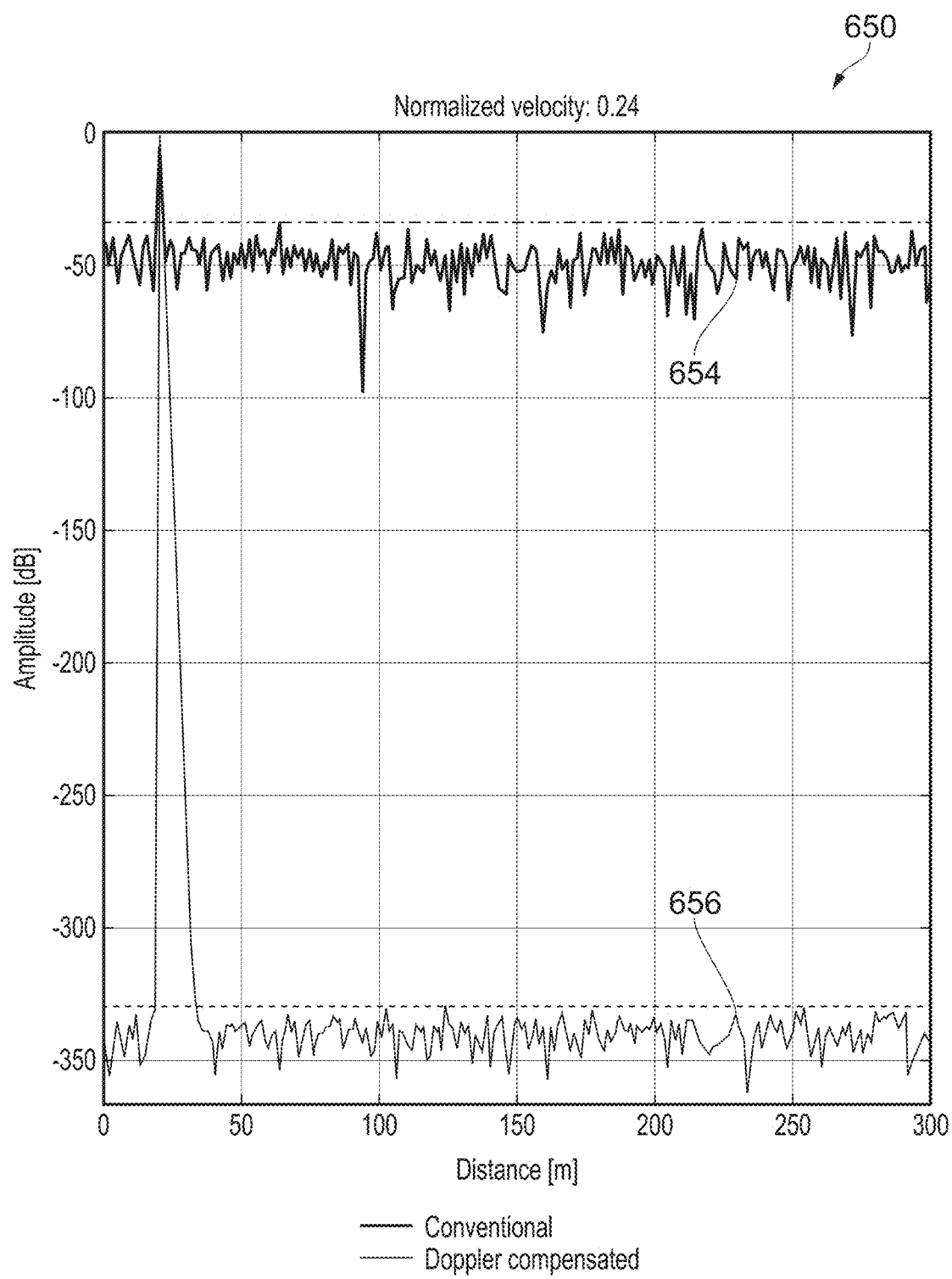
FIG. 6 illustrates a second example comparison of range-Doppler data produced by a radar processor using the uncompensated method of FIG. 1 and the Doppler-compensated method of FIG. 2.
Figure 6:
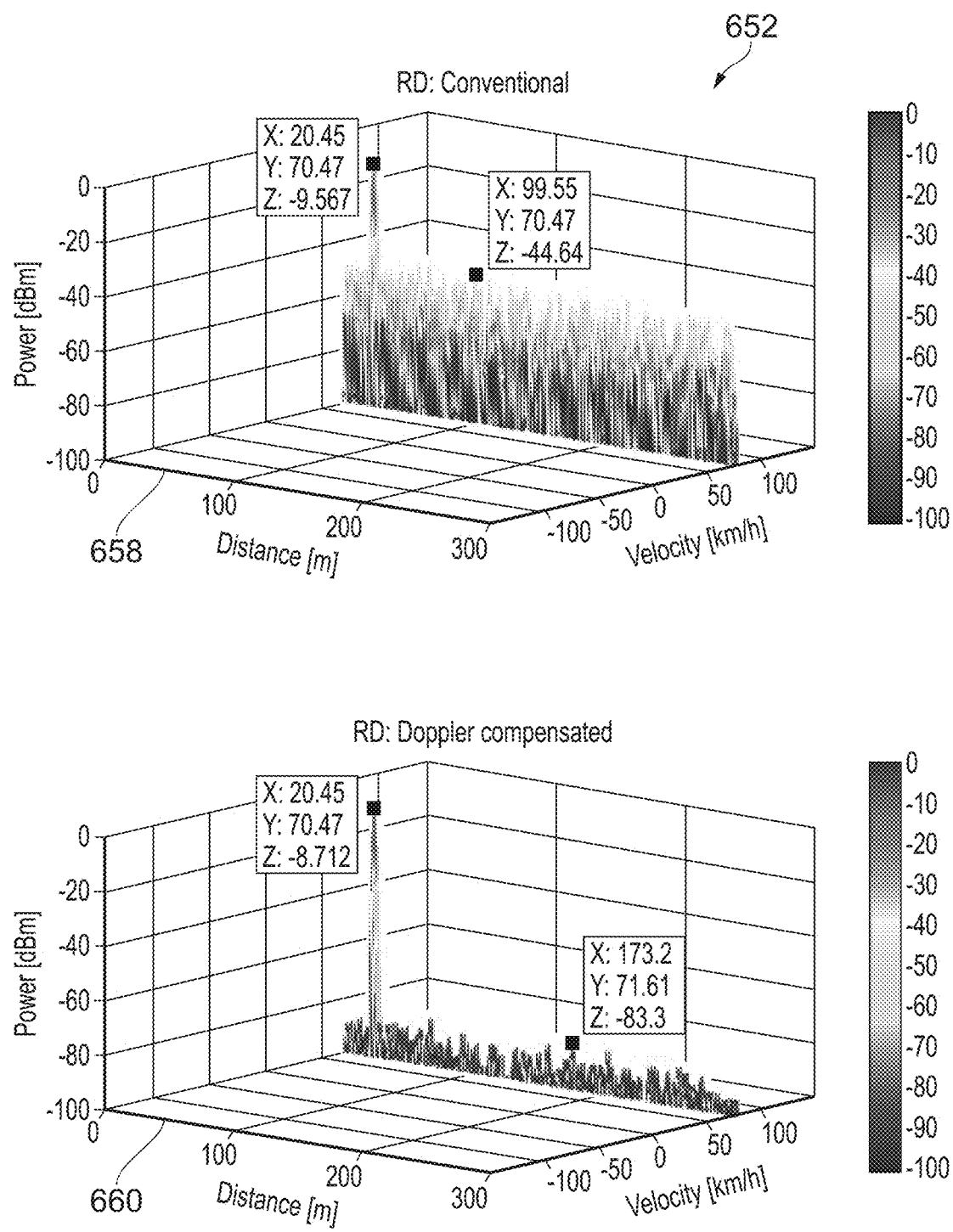
Figure 7:
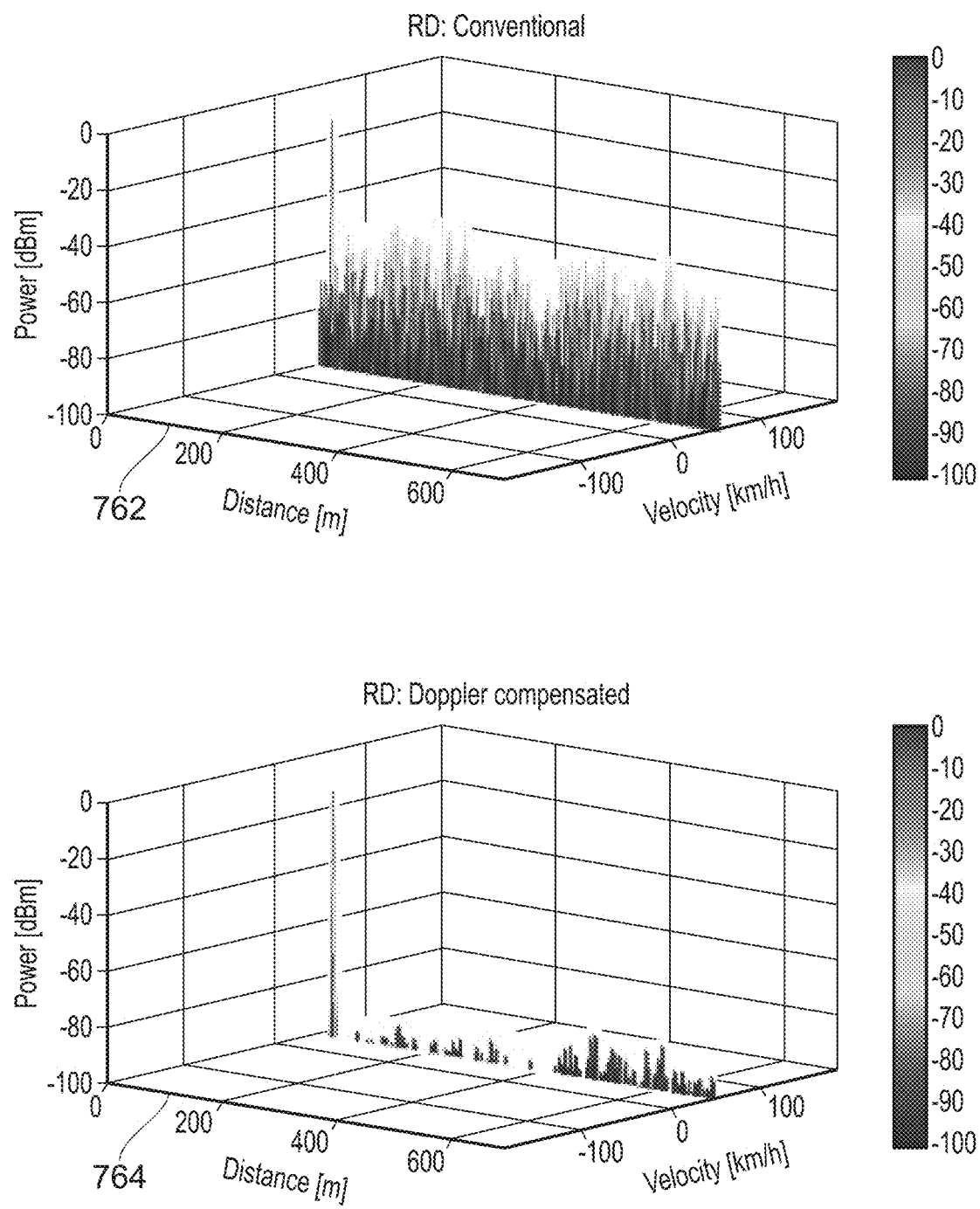
FIG. 7 illustrates a third example comparison of range-Doppler data produced by a radar processor using the uncompensated method of FIG. 1 and the Doppler-compensated method of FIG. 2.
Figure 7:
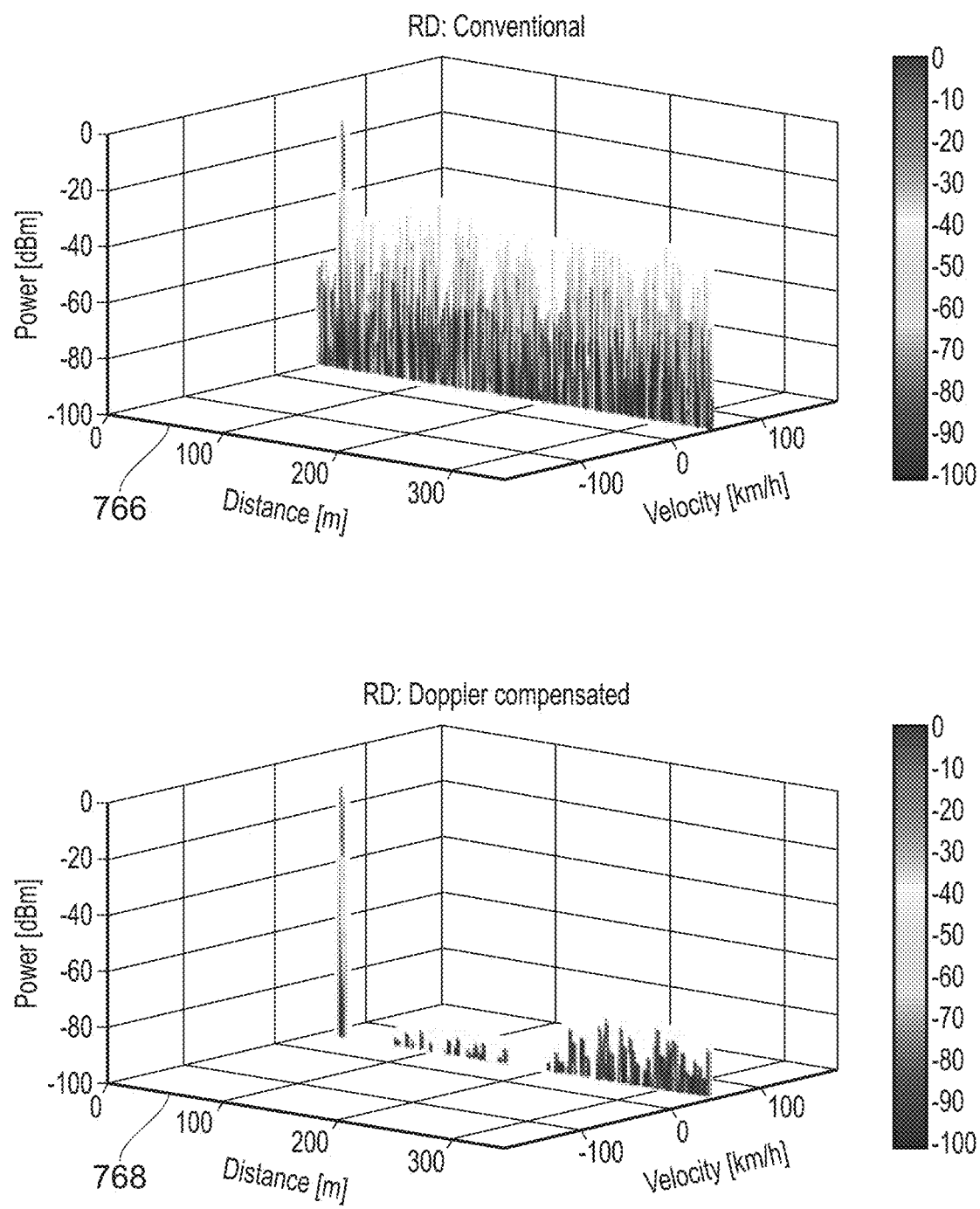

FIGS. 5 to 7 illustrate a comparison of range-Doppler data produced by a radar processor using the uncompensated method of FIG. 1 and the Doppler-compensated method of FIG. 2 (for a single unambiguous correction matrix, $A_0$). FIGS. 5 to 7 illustrate range-Doppler data for which only the first correction matrix, $A_0$, has been applied corresponding to the unambiguous velocity range [−145.5, 145.5) km/h. Ambiguous velocity resolving using a plurality of correction matrices is discussed further below in relation to FIGS. 8 and 9. FIGS. 5 to 7 illustrate the improvement in sidelobe suppression of the Doppler compensated method of FIG. 2. The improvement in sidelobe suppression arises by performing Doppler correction prior to range processing.

In FIGS. 5 and 6, a PMCW waveform is constructed using an APAS sequence of length $L_c$=2586 with N=256 codes being repetitively transmitted. The compensation is independent of the codeword being applied. The range-Doppler data is illustrated for a single target having a target velocity of 70.4 km/h. The target velocity falls within the unambiguous velocity range [−145.5, 145.5) km/h. FIG. 5 illustrates an example in which the target velocity is off-grid and FIG. 6 illustrates an example in which the target velocity is on-grid. An on-grid target velocity refers to a target velocity that corresponds to one of the discrete Doppler correction frequencies (equation 8) used in the correction matrix, $A_0$. An off-grid target velocity refers to a target velocity corresponding to a frequency between two of the discrete Doppler correction frequencies.

Both FIGS. 5 and 6 include a target range profile 550, 650 and range-Doppler maps 552, 652. The target range profiles 550, 650 illustrate the range data in the velocity bin corresponding to the target velocity of 70.4 km/h. The target range profiles 550, 650 illustrate uncompensated range profiles 554, 654 obtained using the uncompensated method of FIG. 1, and Doppler compensated range profiles 556, 656 obtained using the Doppler compensated method of FIG. 2. The Figures illustrate that the Doppler compensated range profiles 556, 656 have an improved sidelobe suppression compared to the uncompensated profiles 554, 654 for both off-grid and on-grid target velocities. The sidelobe suppression improves from ~38 dB to ~78 dB for the off-grid example of FIG. 5 and from ~38 dB to ~330 dB for the on-grid example of FIG. 6.

The range-Doppler maps 552, 652 include an uncompensated range-Doppler map 558, 658 and a Doppler compensated range-Doppler map 560, 660. The range-Doppler maps 552, 652 illustrate similar data to the target range profiles 550, 650. The on-grid range Doppler map 660 also includes data from a velocity gate (v=71.61 km/h) adjacent to the target velocity gate (v=71.47 km/h). The on-grid range-Doppler map 660 illustrates that the ~330 dB sidelobe suppression is only obtained for the on-grid velocity gate corresponding to the target velocity. Adjacent velocity gates have a noise floor at ~75 dB which is a similar level to the side-lobe suppression obtained for the off-grid Doppler compensated target range profile 556.

FIG. 7 illustrates a further example in which a multiple input multiple output (MIMO) arrangement has been applied using the CDMA principle. A ZCZ sequence is used with a sequence length of $L_c$=2048 and number of transmitted codewords N=256.

The figure illustrates an uncompensated range-Doppler map 762 and a Doppler compensated range-Doppler map 764 for a single input single output (SISO) example where 1 transceiver is active such that 1 codeword is used. The figure further illustrates an uncompensated range-Doppler map 766 and a Doppler compensated range-Doppler map 768 for a MIMO example where 4 transceivers are active such that 4 unique codewords are present in the data. The figures illustrate that improved sidelobe suppression is obtained for both SISO and MIMO examples. This shows that the sidelobe suppression improvement is obtained for superimposed signals originating from multiple transmit antennas, hence the techniques mitigate the Doppler artefacts on both the auto- and cross-correlation properties.

In a MIMO example, the radar processor may receive the frame of radar data as a data array from each receiver and arrange the data arrays as a data cube. Each data array may correspond to a different codeword or a single codeword arranged in a time-staggered manner. The radar processor may process the data cube in the same way as described above for a single data array. The radar processor can transform the data cube along the slow axis to obtain a velocity data cube and then correct the velocity data cube using the correction algorithm. In this way, the radar processor can correct the data from each receiver using the same correction algorithm (such as the same plurality of correction matrices). The radar processor may perform range processing on a corrected velocity data cube to obtain the range-Doppler map. Performing the range processing may comprise matched filtering each corrected velocity data array in the corrected velocity data cube with the respective codeword.

As described above (equation 5), the maximum unambiguous velocity, $v_{ua}$, is determined by the pulse repetition time and the carrier wavelength of the radar system. For a radar system configured with a code repetition interval, $T_{CRI}$=23.5 µs and a carrier frequency, $f_c$=79 GHz, the maximum unambiguous velocity, $v_{ua}$=145.5 km/h.

Figure 8:
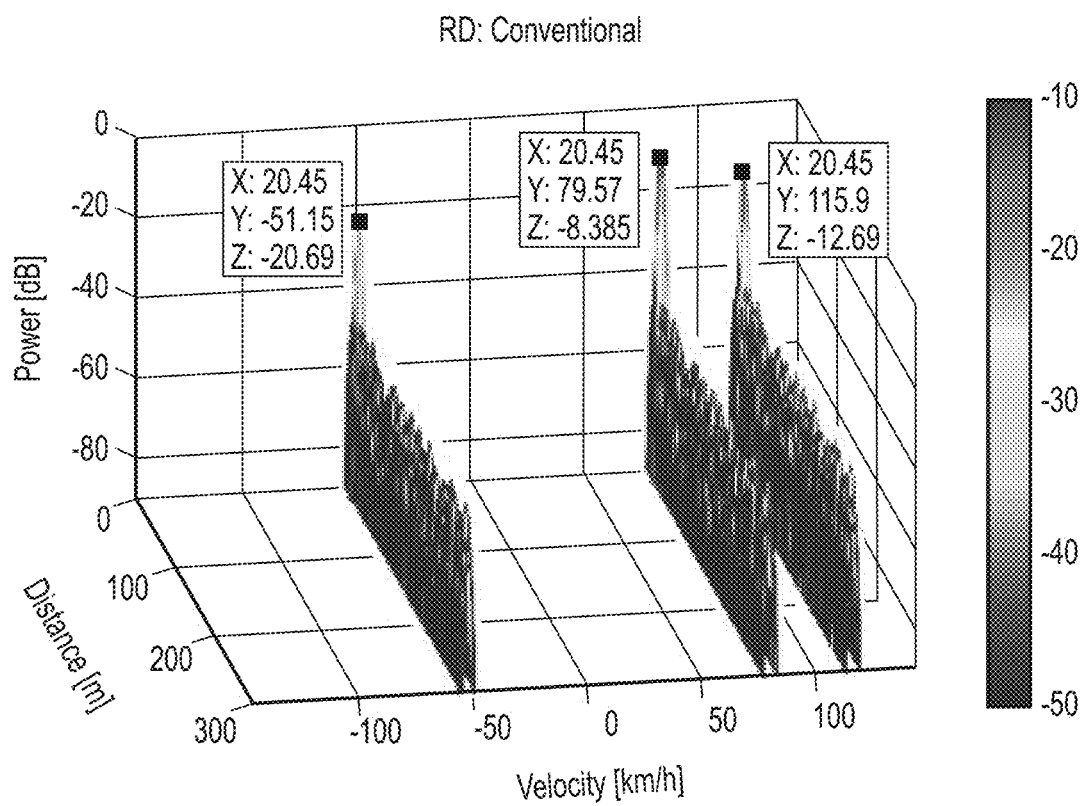
FIG. 8 illustrates an uncompensated range-Doppler map obtained by the uncompensated method of FIG. 1 for three moving targets.

FIG. 8 illustrates an uncompensated range-Doppler map obtained by the uncompensated method of FIG. 1 for three moving targets. The three moving targets comprise one unambiguous target with a target velocity falling inside the unambiguous velocity range [−145, 145] km/h and two ambiguous targets with respective target velocities falling outside the unambiguous velocity range. The targets are arranged at the same distance having the same radar cross section, RCS=10 dBm². The three targets are defined by:

$R_0$=20 m, $v_0$=80 km h$^{-1}$
$R_1$=20 m, $v_1$=240 km h$^{-1}$
$R_2$=20 m, $v_2$=−175 km h$^{-1}$

The figure illustrates that the uncompensated method is unable to distinguish between the unambiguous and unambiguous targets. The range-Doppler map estimates target velocities as −51 km/h, 80 km/h and 115 km/h. Therefore, the target velocities of the first target, $R_0$, and third target, $R_2$, are estimated incorrectly. These two target velocities exceed the maximum unambiguous velocity $|v_k|>v_{ua}$ and their true velocities fold back into the unambiguous velocity range. As expected, all three targets are detected with relatively high range sidelobes of ~30 dB below the peak level.

Returning to FIG. 2, the disclosed radar processors and methods can resolve ambiguous target velocities by applying 208 Doppler correction by applying a set of Doppler correction frequencies wherein at least one Doppler correction frequency corresponds to a velocity outside the unambiguous velocity range. In the example of FIG. 2, the radar processor applies plurality of correction matrices, $A_{-1}$, $A_0$, $A_1$, to the velocity data array, S, prior to range processing 226, 228, 230. The first correction matrix, $A_0$, is based on a set of Doppler correction frequencies corresponding to the unambiguous velocity range. A second correction matrix, $A_{-1}$, and a third correction matrix, $A_1$, are based on respective sets of Doppler correction frequencies corresponding to velocity gates outside the unambiguous velocity range. The radar processor may correct for the Doppler shifts by multiplying the velocity data array, S, by each of the plurality of correction matrices, $A_{-1}$, $A_0$, $A_1$, to obtain a respective plurality of corrected arrays, $S'_{-1}$, $S'_0$, $S'_1$. The radar processor may then perform range processing on each of the corrected arrays, $S'_{-1}$, $S'_0$, $S'_1$, to obtain a respective plurality of Doppler compensated Range-Doppler maps, $U_{-1}$, $U_0$, $U_1$. The radar processor may perform range processing on each of the corrected arrays, $S'_{-1}$, $S'_0$, $S'_1$, in the same manner as described above for the first corrected array, $S'_0$. Following range processing 226, 228, 230, the radar processor can determine 232 one or more true target velocities from the plurality of Doppler compensated Range-Doppler maps, $U_{-1}$, $U_0$, $U_1$.

By applying a plurality of correction matrices, $A_{-1}$, $A_0$, $A_1$, the radar processor effectively applies multiple hypotheses to the target velocities. The plurality of correction matrices, $A_{-1}$, $A_0$, $A_1$, correspond to differing velocity ranges as follows:

$$A_{-1}[n, m] = e^{-j2\pi \cdot f'_{D_{-1}}(n)\frac{m}{L_c}} \quad (13)$$
$$A_0[n, m] = e^{-j2\pi \cdot f'_{D_0}(n)\frac{m}{L_c}}$$
$$A_1[n, m] = e^{-j2\pi \cdot f'_{D_1}(n)\frac{m}{L_c}}$$

with $$f'_{D_i} = f'_{D_0} + i \cdot N \quad (14)$$

where i is an integer, $f'_{D_0}$ is the set of Doppler correction frequencies corresponding to the unambiguous velocity range and $f'_{D_i}$ is the set of Doppler correction frequencies corresponding to velocity gates outside the unambiguous velocity range.

Therefore, each correction matrix is defined individually for the velocity ranges $[-3v_{ua}, -v_{ua})$, $[-v_{ua}, v_{ua})$ and $[v_{ua}, 3v_{ua})$, respectively.

When the radar processor applies a particular correction matrix to a target with a target velocity falling outside the velocity range of that matrix, the resulting signal to noise ratio (SNR) loss will be very high for that target. In other words, the radar processor compensates the target velocity with a wrongly estimated Doppler frequency according to equations 10 and 11 resulting in an extreme signal-to-noise ratio (SNR) loss for the target. Therefore, even though the target velocity may still be effectively folded back into the range, the peak is not identifiable because the application of the correction matrix destroys the peak. The target (ghost) peak will vanish, due to limited coherency of the incorrectly compensated signal, while only a ridge along the range profile remains along the full target's ambiguous velocity bin. As a result, only targets with their true target velocity within the specific velocity range of a correction matrix can be detected using that correction matrix. By applying multiple correction matrices, the radar processor can effectively extend its velocity range beyond the unambiguous velocity range for a particular carrier frequency and pulse duration. The radar processor provides a plurality of range-Doppler maps, $U_{-1}$, $U_0$, $U_1$, with only the targets present in the velocity region that is desired. Therefore, velocity ambiguity is resolved the plurality of correction matrices $A_{-1}$, $A_0$, $A_1$.

Figure 9:
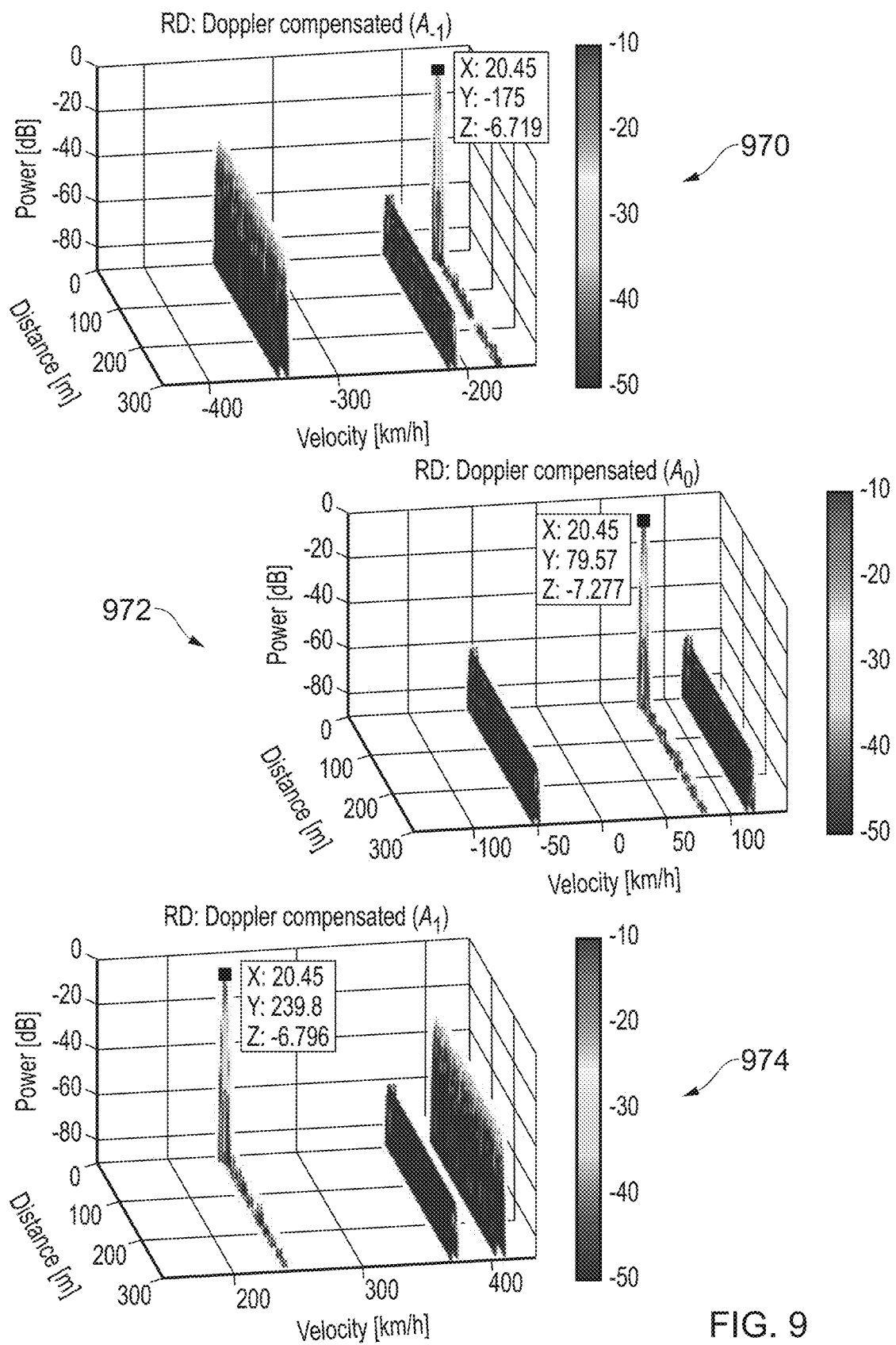
FIG. 9 illustrates a plurality of Doppler compensated range Doppler maps produced by a radar processor according to an embodiment of the present disclosure.

FIG. 9 illustrates a plurality of Doppler compensated range Doppler maps produced by a radar processor according to an embodiment of the present disclosure. The same three targets, $R_0$, $R_1$, $R_2$ are used as described above in relation to FIG. 8.

A first range-Doppler map 972 corresponds to the first correction matrix, $A_0$, and the unambiguous velocity range of $[-v_{ua}, -v_{ua})$ $[-145.5, 145.5)$ km/h. A target peak can be seen corresponding to the first target, $R_0$, with a velocity of 80 km/h. Unlike the range-Doppler map of FIG. 8 with the same unambiguous velocity range, no peaks are seen in the velocity gates corresponding to the folded velocities of the second and third targets, $R_1$, $R_2$, with target velocities falling outside the unambiguous range of the first correction matrix, $A_0$.

A second range-Doppler map 970 corresponds to the second correction matrix, $A_{-1}$, with a corresponding velocity range of $[-3v_{ua}, -v_{ua})$ $[-436.5, -145.5)$ km/h outside the unambiguous velocity range, $[-v_{ua}, -v_{ua})$. A target peak can be seen corresponding to the third target, $R_2$, with a velocity of $-175$ km/h. No peaks are seen in the velocity gates corresponding to the folded velocities of the first and second targets, $R_0$, $R_1$, with target velocities falling outside the velocity range of the second correction matrix, $A_{-1}$.

A third range-Doppler map 974 corresponds to the third correction matrix, $A_1$, with an velocity range of $[v_{ua}, 3v_{ua})$ $[145.5, 436.5)$ km/h outside the unambiguous velocity range, $[-v_{ua}, v_{ua})$. A target peak can be seen corresponding to the second target, $R_2$, with a velocity of 240 km/h. No peaks are seen in the velocity gates corresponding to the folded velocities of the first and third targets, $R_0$, $R_2$, with target velocities falling outside the velocity range of the third correction matrix, $A_1$.

The second target moving at $v_1=240$ km h$^{-1}$ undergoes most of the peak power losses. The third range-Doppler map indicates that the Doppler compensation approach results in a peak power increase of 13.79 dB compared to the corresponding peak in the uncompensated range-Doppler map of FIG. 8. Therefore, the Doppler compensation of the radar processor provides increased sensitivity (due to sidelobe reduction and peak power enhancement) combined with ambiguity resolving capabilities.

The first to third range-Doppler maps 970, 972, 974 illustrate that when a target is present in an adjacent velocity region, with respect to the velocity region of interest, range compression results in a ridge (that is likely to fall under the thermal noise floor). This results from the application of the incorrect correction matrix which has been applied as compensation for the specific target. The formed ridge will exceed the levels achieved for the optimally suppressed sidelobes, but may still be below the inherent, non-compensated Doppler sidelobe level (as presented in FIG. 8). However, the peaks of the targets fall below the ridge due to incoherency with the transmitted signal. For example, the range ridges in the second range Doppler map 972 fall well below the thermal noise floor, even for high SNR targets (55.9 dB between peak power and noise ridge).

However, in the presence of at least two targets in two non-consecutive velocity ranges, e.g. $[(2n-1) \cdot v_{ua}, (2n+1) \cdot v_{ua})$ and $[(2n+1) \cdot v_{ua}, (2n+3) \cdot v_{ua})$ with n being any integer number (as shown in the illustrated example n=2 and the second and third targets at 240 km/h and $-175$ km/h, respectively), the noise ridge of the two times backfolded ambiguous target can increase by approximately 30 dB. In practice, this is very unlikely to happen due to the generally short code repetition interval in PMCW/OFDM radars, hence relatively high $v_{ua}$.

Performing Doppler compensation with the plurality of correction matrices to enable ambiguity resolving may require duplicate processing steps compared to the uncompensated range-Doppler processing of FIG. 1. Therefore, in one or more examples, the radar processor may selectively apply the plurality of correction matrices for received frames of radar data to alleviate any additional computational burden. In this way, the radar processor can acquire a-priori information on the target velocities present for a particular frame of data and then selectively apply a subset of the plurality of correction matrices for subsequent frames. The subset of correction matrices will correspond to the correction matrices with a velocity range encompassing one of the target velocities.

Referring back to FIG. 2, the radar processor may perform an optional step of determining 210 a subset of correction matrices based on received a-priori data comprising information on the target velocities. In some examples, the a-priori data may be received from another radar system. In other examples, the a-priori data may be received from a memory or a register. The radar processor may be configured to determine the one or more target velocities for a particular frame of radar data and store the one or more target velocities in the memory as the a-priori data for use with a subsequent frame of radar data. Following receipt of the a-priori data, the radar processor may determine a subset of correction matrices each with a corresponding set of Doppler frequencies corresponding to velocity gates encompassing the one or more target velocities. The radar processor may then correct the velocity data array with only the subset of correction matrices and not correct the velocity data array with any correction matrices not in the subset of correction matrices.

In one example, the radar processor may selectively apply the full plurality of correction matrices (for example, the three Doppler compensation matrices, $A_{-1}, A_0, A_1$) for a first frame of data. The radar processor can then determine the target velocities present (for example $R_0=80$ km/h and $R_1=240$ km/h) based on the range-Doppler map for the first frame and determine the subset of the plurality of correction matrices (in this example, $A_0$ and $A_1$) with velocity ranges encompassing the detected target velocities. In this way, the radar processor can use the target velocities detected in the first frame as a-priori information for subsequent frames. In other examples, the radar processor may receive a-priori information on the target velocities of the one or more targets from another radar system.

The radar processor may correct a second frame of data with the subset of correction matrices ($A_0$, $A_1$). In one example, the radar processor may determine a second velocity data array by performing a FFT on the second frame of data and multiply the second velocity data array by each correction matrix of the subset of correction matrices. In other examples, the radar processor may determine a consolidated correction matrix based on the subset of correction matrices and multiply the second velocity data array with the consolidated correction matrix. The radar processor may determine a set of Doppler correction frequencies of the consolidated correction matrix by determining one or more Doppler correction frequencies in each of the subset of correction matrices that correspond to velocity gates encompassing the target velocities determined in the first frame. The one or more Doppler correction frequencies of the consolidated matrix may include Doppler correction frequencies adjacent to the Doppler correction frequencies encompassing the targets to allow for a change in velocity of the targets. The consolidated correction matrix may then comprise the one or more Doppler correction frequencies (and optionally adjacent Doppler correction frequencies) from each correction matrix of the subset of correction matrices. As a result, the consolidated correction matrix consists of rows that correspond with the targets' detected Doppler shifts $f'_D(n)$, as defined in equation 10. In this way, the consolidated matrix comprises a set of Doppler correction frequencies corresponding to a set of velocity gates and at least one of the Doppler correction frequencies corresponds to a velocity gate outside the unambiguous velocity range. The radar processor may multiply the consolidated correction matrix with the second velocity data array to correct a Doppler shift of the frame.

The radar processor may selectively apply the full plurality of correction matrices periodically, for example, once every K frames. In this way, the radar processor can update the subset of correction matrices periodically. The radar processor can then correct frames based on the subset for the intervening K−1 frames.

In some examples, a radar system may use a first codeword repetition interval for a first frame (and optionally every K frames) and a second codeword repetition interval for subsequent frames (intervening frames), wherein the first codeword repetition interval is shorter than the second codeword repetition interval. In this way, the first frame may have a large unambiguous velocity range and the radar processor may determine the target velocities present using the first correction matrix, A0, corresponding to the unambiguous velocity range. The target velocities can then be stored as the a-priori data. For subsequent frames with the longer code repetition interval and smaller unambiguous velocity ranges, the radar processor may apply a correction algorithm with a set of Doppler correction frequencies corresponding to the target velocities and at least one of the set of Doppler correction frequencies may correspond to a velocity gate outside the unambiguous velocity range. In this way, the radar system may operate in a multimode in which initially the $T_{CRI}$ is small (and codeword short) to determine target velocity information. The system then switches to a mode with large $T_{CRI}$ (long codeword, better sensitivity) in which target velocities can become ambiguous. However, the radar processor can apply Doppler correction frequencies outside the unambiguous velocity range and use the a-priori data from the first frame to solve the ambiguities.

In this way, once the radar processor determines that there are ambiguous targets with target velocities outside the unambiguous velocity range, it can apply additional single or multiple adjusted correction matrix/matrices.

Figure 4:
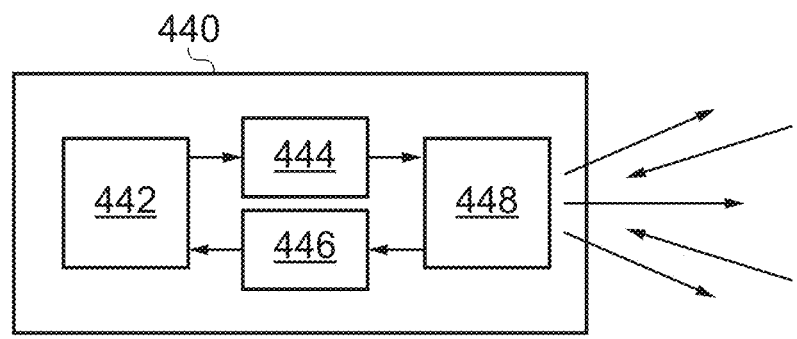
FIG. 4 illustrates a PMCW radar system comprising a radar processor according to an embodiment of the present disclosure.

FIG. 4 illustrates a PMCW radar system 440 comprising a radar processor 442 according to an embodiment of the present disclosure. The radar processor may implement the method of FIG. 2 or any other methods according to embodiments of the present disclosure.

In this example, the PMCW radar system 440 comprises the radar processor 442 and a transceiver 448. The transceiver 448 may be an RF transceiver and transmit frames of radar data via an antenna. The radar data may comprise the sequence of N codewords as described above. The radar processor 442 may generate a digital signal corresponding to the frames of radar data and pass it to a digital to analogue converter (DAC) 444. The DAC 444 can convert the digital signal to an analogue signal for transmission by the transceiver as an RF signal.

The transmitted frames may reflect off one or more targets (not illustrated) and return to the radar system 440. Any targets moving at a velocity relative to the radar system 440 will impart a Doppler frequency shift on the transmitted frame dependent on the velocity.

The transceiver 448 may receive the reflected frames of radar data via the antenna and pass the received analogue signal to an ADC 446. The ADC 446 may convert the analogue signal to a digital received signal, y. The radar processor 442 may receive the frame of radar data from the ADC 446. The radar processor 442 may then process the radar data as described above.

It will be appreciated that the radar system 440 of FIG. 4 may comprise variations and/or further components that are considered conventional in the art. It will be further appreciated the radar system 440 and radar processor 442 may receive a frame of radar data transmitted by another antenna in a multiple antenna arrangement such as a code-division multiple access (CDMA) set up.

The disclosed radar processor and signal processing techniques can be applied in all radar systems. In FMCW radar systems, the disclosed processor can provide a solution to reduce the range-velocity coupling. In digitally modulated radar (DMR) systems, like PMCW, orthogonal frequency division multiplexing (OFDM) and orthogonal time frequency space (OTFS), the disclosed processor and methods may correct for the Doppler distortions that those radar sensors are typically sensitive to. Therefore, the disclosed embodiments are suitable for NextGen DMR radar sensors.

The disclosed radar processor and method is particularly suitable for PMCW radars, or any alternative radar signal, that is characterized by the repeated transmission of a waveform within a measurement frame. The compensation technique is non-iterative, scenario-independent and also provides velocity ambiguity resolving.

The radar processor and method first extract the velocity profiles, followed by the range profiles. This approach allows for de-rotating the phase evolution along the fast time samples from the estimated velocity profiles. After this correction, range processing is performed to produce the range-Doppler map.

The disclosed radar processor can correct Doppler shifts caused by objects moving within the unambiguous velocity range and can be extended by parallel use of correction matrices that correspond to velocities beyond the unambiguous velocity range. Hence, one or more correction matrices can be used in parallel in order to detect objects moving with ambiguous velocities.

A Phase-Modulated Continuous Wave (PMCW) RADAR transmits digital codes, that are intrinsically highly intolerant to Doppler shifts. The disclosed radar processors can perform a non-iterative and scenario-independent technique that significantly decreases the Doppler-induced performance degradation.

In some examples, additional processing power may be provided to maintain an update rate or increase the latency to compensate all data being collected before range processing commences.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A radar processor for processing a frame of radar data received from one or more targets, the frame of radar data having a carrier frequency and comprising a sequence of codewords with a codeword repetition interval, wherein the carrier frequency and the codeword repetition interval define an unambiguous velocity range, the radar processor configured to:
   receive the frame of radar data;
   transform the frame to obtain a velocity data array;
   apply a correction algorithm to the velocity data array to correct a Doppler shift of the frame to obtain a corrected array, wherein the correction algorithm comprises a set of Doppler correction frequencies corresponding to a set of velocity gates and at least one of the set of Doppler correction frequencies corresponds to a velocity gate outside the unambiguous velocity range; and
   perform range processing on the corrected array to obtain a range-Doppler map.

2. The radar processor of claim 1, further configured to determine a velocity of each of the one or more targets based on the range-Doppler map.

3. The radar processor of claim 1, wherein the correction algorithm comprises a plurality of correction matrices, each correction matrix corresponding to a different set of Doppler correction frequencies each with an associated velocity range, and wherein the radar processor is configured to:
   apply the correction algorithm by multiplying the velocity data array with each one of the plurality of correction matrices to obtain a plurality of respective corrected arrays; and
   perform range processing on the plurality of respective corrected arrays to obtain the range-Doppler map.

4. The radar processor of claim 3, further configured to:
   determine a velocity of each of the one or more targets based on the range-Doppler map for the frame of data;
   determine a subset of correction matrices comprising correction matrices with a velocity range encompassing one or more of the velocities of each of the one or more targets;
   receive a second frame of time-domain radar data;
   transform the second frame to obtain a second velocity data array;
   correct the second velocity data array based on the subset of correction matrices to obtain one or more second corrected arrays; and
   perform range processing on the one or more second corrected arrays to obtain a second range-Doppler map.

5. The radar processor of claim 4, configured to multiply the second velocity data array with each one of the subset of correction matrices to obtain the one or more second corrected arrays.

6. The radar processor of claim 4, configured to:
   determine a consolidated correction matrix based on the subset of correction matrices;

multiply the second velocity data array with the consolidated correction matrix to obtain a consolidated second corrected array; and perform range processing on the consolidated second corrected array to obtain the second range-Doppler map.

7. The radar processor of claim 4, configured to:
receive a third frame of time-domain radar data;
transform the third frame to obtain a third velocity data array;
multiply the velocity data array with each one of the plurality of correction matrices, to obtain a plurality of respective third corrected arrays;
perform range processing on the plurality of respective third corrected arrays to obtain a third range-Doppler map;
determine a velocity of each of the one or more targets based on the third range-Doppler map for the third frame of data; and
update the subset of correction matrices comprising correction matrices with a velocity range encompassing one or more of the velocities of each of the one or more targets.

8. The radar processor of claim 1, further configured to:
receive a-priori data providing information on target velocities of the one or more targets at an earlier time; and
determine the set of Doppler frequencies based on the a-priori data.

9. The radar processor of claim 8, wherein the radar processor is configured to:
determine a velocity of each of the one or more targets based on the range-Doppler map for the frame of data;
store the velocity of each of the one or more targets as the a-priori data; and
receive the a-priori data for use with a subsequent frame of radar data.

10. The radar processor of claim 8, wherein the radar processor is configured to receive the a-priori data from a second radar processor.

11. The radar processor of claim 1 wherein the frame of radar data is a phase modulated continuous wave, PMCW, frame of radar data and the radar processor is suitable for use in a PMCW radar system.

12. The radar processor of claim 1, wherein the radar processor is configured to receive the frame of radar data from a plurality of receivers in a multiple input multiple output radar system arrangement.

13. A radar system comprising:
a radar processor for processing a frame of radar data received from one or more targets, the frame of radar data having a carrier frequency and comprising a sequence of codewords with a codeword repetition interval, wherein the carrier frequency and the codeword repetition interval define an unambiguous velocity range, the radar processor configured to:
receive the frame of radar data;
transform the frame to obtain a velocity data array;
apply a correction algorithm to the velocity data array to correct a Doppler shift of the frame to obtain a corrected array, wherein the correction algorithm comprises a set of Doppler correction frequencies corresponding to a set of velocity gates and at least one of the set of Doppler correction frequencies corresponds to a velocity gate outside the unambiguous velocity range; and
perform range processing on the corrected array to obtain a range-Doppler map.

14. The radar system of claim 13, wherein the radar system is an automotive radar system.

15. A method for processing a frame of radar data received from one or more targets, the frame of radar data having a carrier frequency and comprising a sequence of codewords with a codeword repetition interval, wherein the carrier frequency and the codeword repetition interval define an unambiguous velocity range, the method comprising:
receiving the frame of radar data;
transforming the frame to obtain a velocity data array;
applying a correction algorithm to the velocity data array to correct a Doppler shift of the frame to obtain a corrected array, wherein applying the correction algorithm comprises applying a set of Doppler correction frequencies corresponding to a set of velocity gates, wherein at least one of the set of Doppler correction frequencies corresponds to a velocity gate outside the unambiguous velocity range; and
performing range processing on the corrected array to obtain a range-Doppler map.

16. The method of claim 15, further comprising determining a velocity of each of the one or more targets based on the range-Doppler map.

17. The method of claim 15, further comprising:
receiving a-priori data providing information on target velocities of the one or more targets at an earlier time; and
determining the set of Doppler frequencies based on the a-priori data.

18. The method of claim 17, further comprising:
determining a velocity of each of the one or more targets based on the range-Doppler map for the frame of radar data;
storing the velocity of each of the one or more targets as the a-priori data; and
receiving the a-priori data for use with a subsequent frame of radar data.

19. The method of claim 15, wherein the correction algorithm comprises a plurality of correction matrices, each correction matrix corresponding to a different set of Doppler correction frequencies each with an associated velocity range, the method further comprising:
applying the correction algorithm by multiplying the velocity data array with each one of the plurality of correction matrices to obtain a plurality of respective corrected arrays; and
performing range processing on the plurality of respective corrected arrays to obtain the range-Doppler map.

20. The method of claim 19, further comprising:
determining a velocity of each of the one or more targets based on the range-Doppler map for the frame of radar data;
determining a subset of correction matrices comprising correction matrices with a velocity range encompassing one or more of the velocities of each of the one or more targets;
receiving a second frame of time-domain radar data;
transforming the second frame to obtain a second velocity data array;

correcting the second velocity data array based on the subset of correction matrices to obtain one or more second corrected arrays; and performing range processing on the one or more second corrected arrays to obtain a second range-Doppler map.

* * * * *